(12) United States Patent
Rhee et al.

(10) Patent No.: US 11,755,898 B1
(45) Date of Patent: Sep. 12, 2023

(54) NEAR-MEMORY PROCESSING OF EMBEDDINGS METHOD AND SYSTEM FOR REDUCING MEMORY SIZE AND ENERGY IN DEEP LEARNING-BASED RECOMMENDATION SYSTEMS

(71) Applicant: Inha University Research and Business Foundation, Incheon (KR)

(72) Inventors: Chae Eun Rhee, Incheon (KR); Myungkeun Cho, Incheon (KR)

(73) Assignee: Inha University Research and Business Foundation, Incheon (KR)

( * ) Notice: Subject to any disclaimer, the term of this patent is extended or adjusted under 35 U.S.C. 154(b) by 0 days.

(21) Appl. No.: 18/308,567

(22) Filed: Apr. 27, 2023

(30) Foreign Application Priority Data

Jul. 12, 2022 (KR) ........................ 10-2022-0085533

(51) Int. Cl.
| | |
|---|---|
| *G06F 9/46* | (2006.01) |
| *G06N 3/063* | (2023.01) |
| *G06N 3/09* | (2023.01) |
| *G06F 9/50* | (2006.01) |

(52) U.S. Cl.
CPC ........... *G06N 3/063* (2013.01); *G06F 9/5016* (2013.01); *G06N 3/09* (2023.01); *G06F 9/5033* (2013.01); *G06F 2209/502* (2013.01); *G06F 2209/509* (2013.01)

(58) Field of Classification Search
CPC ................. G06F 9/5016; G06F 9/5033; G06F 2209/502; G06F 2209/509
See application file for complete search history.

(56) References Cited

U.S. PATENT DOCUMENTS

2006/0242416 A1   10/2006  Sharma et al.

FOREIGN PATENT DOCUMENTS

| EP | 1 913 531 | 2/2019 |
|---|---|---|
| EP | 3 800 590 | 7/2021 |

OTHER PUBLICATIONS

Kwon et al., "TensorDIMM: A Practical Near-Memory Processing Architecture for Embeddings and Tensor Operations in Deep Learing," MICRO-52, (Oct. 2019) 14 pages.

(Continued)

*Primary Examiner* — Gregory A Kessler
(74) *Attorney, Agent, or Firm* — Christensen O'Connor Johnson Kindness PLLC

(57) ABSTRACT

Provided is a hybrid near-memory processing system including a GPU, a PIM-HBM, a CPU, and a main memory. An embedding vector is loaded through the GPU and the PIM-HBM, an embedding table is divided and stored in the main memory and the HBM in a training process for inference of a recommendation system, an embedding lookup operation is performed in the main memory or the HBM according to a location of a necessary embedding vector in an inference process of the recommendation system, an additional embedding manipulation operation is performed in the CPU and the PIM with respect to the embedding vector of which the embedding lookup operation is completed, embedding vectors processed through embedding manipulation are finally concatenated in the PIM to generate an embedding result, and the embedding result is transmitted to the GPU to derive a final inference result through a top multiplayer perceptron (MLP) process.

6 Claims, 11 Drawing Sheets

(56) References Cited

OTHER PUBLICATIONS

Korean Office Action for Application No. 10-2022-0085533, dated Feb. 28, 2023.
Korean Notice of Allowance for Application No. 10-2022-0085533, dated Mar. 22, 2023.

NEAR-MEMORY PROCESSING OF EMBEDDINGS METHOD AND SYSTEM FOR REDUCING MEMORY SIZE AND ENERGY IN DEEP LEARNING-BASED RECOMMENDATION SYSTEMS

CROSS-REFERENCE TO RELATED APPLICATION

This application claims the priority benefit of Korean Patent Application No. 10-2022-0085533, filed on Jul. 12, 2022, in the Korean Intellectual Property Office, the disclosure of which is incorporated herein by reference in its entirety.

BACKGROUND

1. Field of the Invention

Example embodiments relate to a method and system for near-memory processing of embeddings that may reduce a memory size and energy in a deep learning-based recommendation system.

2. Description of the Related Art

Currently, technology using artificial intelligence is gaining great attention in various fields. In particular, a recommendation system using deep learning technology is in the spotlight with the industrial trend in which personalized services are being preferred. The recommendation system is used in many fields, for example, industrial video recommendation, social network service (SNS), and application recommendation. The recommendation system generally uses continuous (dense) features such as price, age, and annual salary, and categorical (sparse) features such as gender, age group, and genre, as input data. The more input data is used, the higher the probability of providing appropriate content to each user. Here, the categorical features are processed through an embedding to three-dimensionally verify relational features and to generate data suitable for a deep learning model.

However, the embedding has two unique issues. First, an embedding table of several hundreds of giga bytes or more is required to increase accuracy of a model and a large amount of memory resources is required accordingly. Second, an embedding table lookup operation requires a frequent and irregular memory access and thus, the existing prefetch scheme or cache application is ineffective. Due to such characteristics, an embedding of the recommendation system refers to a memory-intensive operation that causes a memory resource shortage and a memory bottleneck situation. To solve an issue caused by the embedding of the recommendation system, not the existing computing structure but a novel computing structure is required.

Processing in memory (PIM) known as short-distance data processing technology is a most promising structural approach that may dramatically reduce an amount of data movement. In general, the PIM is used by being mounted to a logic die of a three-dimensional (3D) stacked memory, such as hybrid memory cube (HMC) and high bandwidth memory (HBM). Also, since the PIM is directly accessible to a memory through a through silicon via (TSV), it is expected to solve many issues occurring in the existing memory structure, such as a bottleneck situation and energy inefficiency caused by long latency and a memory bandwidth. However, another issue needs to be solved to apply the PIM using the 3D stacked memory to the recommendation system. Unlike a conventional dual in-line memory module (DIMM), the 3D stacked memory has an issue in that an amount of memory resources is insufficient and scalability is poor.

SUMMARY

Example embodiments propose two offloading schemes with a new hybrid near-memory processing structure to improve inference performance by enhancing an embedding issue of a recommendation system. Also, example embodiments propose a structure using a processing-in-memory in high bandwidth memory (PIM-HBM) to utilize advantages such as inference speed, energy and power consumption, and the like, and propose a data offloading scheme and a task offloading scheme for further improving inference performance by efficiently using a PIM-HBM structure.

According to an aspect, there is provided a hybrid near-memory processing system including a graphics processing unit (GPU), a processing-in-memory in high bandwidth memory (PIM-HBM), a central processing unit (CPU), and a main memory. An embedding vector is loaded through the GPU and the PIM-HBM, an embedding table is divided and stored in the main memory and the HBM in a training process for inference of a recommendation system, an embedding lookup operation is performed in the main memory or the HBM according to a location of a necessary embedding vector in an inference process of the recommendation system, an additional embedding manipulation operation is performed in the CPU and the PIM with respect to the embedding vector of which the embedding lookup operation is completed, embedding vectors processed through embedding manipulation are finally concatenated in the PIM to generate an embedding result, and the embedding result is transmitted to the GPU to derive a final inference result through a top multiplayer perceptron (MLP) process.

According to an example embodiment, a data offloading storage scheme of storing a hot embedding vector in the HBM and storing a cold embedding vector in the main memory according to the number of accesses to the embedding table is used to increase a memory bandwidth and to solve a memory capacity shortage issue.

According to an example embodiment, post training is performed through compositional embeddings to use the data offloading storage scheme, and the post training includes a process of classifying the number of embedding vector data to be stored in the main memory and the HBM by setting the number of optimal embedding vector data according to a hash collision and a process of integrating an embedding table to be stored in the main memory in the same form as an original embedding table to reduce an unnecessary hash function computation process.

According to an example embodiment, a task offloading scheme of processing embedding lookup through a hash computation using the PIM is performed, and the task offloading scheme, in response to an input of an input index, computes an index for each of Q table and R table through the hash computation in the PIM, loads an embedding vector from each of the Q table and the R table using the corresponding index, and generates the final embedding vector through an embedding manipulation process for the loaded embedding vectors.

According to an example embodiment, the embedding manipulation concatenates the loaded embedding vectors in the case of one hot embedding and generates the final embedding vector through an inter-vector operation in the case of a multi-hot embedding according to an embedding dataset.

According to another aspect, there is provided an operating method of a hybrid near-memory processing system including a GPU, a PIM-HBM, a CPU, and a main memory, the method including performing post training of loading an embedding vector through the GPU and the PIM-HBM, and dividing and storing an embedding table in the main memory and the HBM according to a data characteristic in a training process for inference of a recommendation system; performing an embedding lookup operation in the main memory or the HBM according to a location of a necessary embedding vector in an inference process of the recommendation system; performing an additional embedding manipulation operation in the CPU and the PIM with respect to the embedding vector of which the embedding lookup operation is completed; and generating an embedding result by finally concatenating embedding vectors processed through embedding manipulation in the PIM, and deriving a final inference result through a top MLP process by transmitting the embedding result to the GPU.

Through a hybrid near-memory processing method and system according to example embodiments, it is possible to reduce a memory size and energy in a deep learning-based recommendation system and to improve inference performance by enhancing an embedding issue of a recommendation system. Also, by proposing a structure using a PIM-HBM and also proposing a data offloading scheme and a task offloading scheme for further improving inference performance by efficiently using a PIM-HBM structure, it is possible to utilize advantages, such as inference speed, energy and power consumption, and the like.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
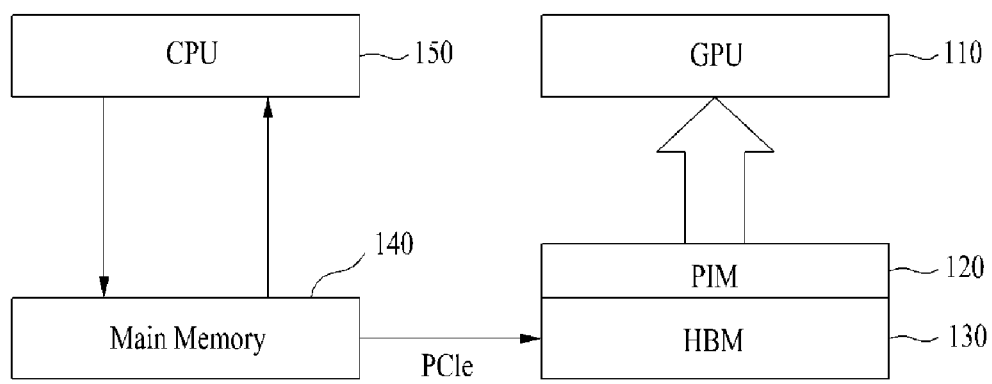
FIG. 1 illustrates a configuration of a near-memory processing system of embedding according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers. steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Currently, there is an increasing interest in artificial intelligence and deep learning technology in various fields. In particular, a deep learning-based recommendation system is in the spotlight with the industrial trend in which personalized services are being preferred. The recommendation system essentially requires an embedding process to three-dimensionally verify relational features by converting categorical features to dense representation and to generate the same as data suitable for a deep learning model. Also, an embedding of the recommendation system refers to a memory-intensive process in which a size of an embedding table is verify large to improve accuracy of a model and this causes a memory capacity shortage issue and the occurrence of frequent and irregular memory accesses in an embedding table lookup process causes a memory bottleneck situation.

To improve inference performance by solve the above issues, proposed is a new hybrid near-memory processing structure using a processing-in-memory in high bandwidth memory (PIM-HBM) structure. Experiments are performed for each of a training process and an inference process and measure accuracy, processing speed, and energy consumption. An evaluation result shows that the hybrid near-memory processing structure is effective in improving the inference performance of the recommendation system.

Herein, proposed are two offloading schemes with a new hybrid near-memory processing structure to improve inference performance by enhancing an embedding issue of a recommendation system.

Proposed is a structure using PIM-HBM to utilize advantages, such as inference speed, energy and power consumption, and the like. Also, proposed are a data offloading scheme and a task offloading scheme to further improve inference performance by efficiently using a PIM-HBM structure. A training process using the data offloading scheme is performed using a double hash trick and goes through a post training process for dividing and storing an embedding table in an HBM and a main memory. Also, inference using the task offloading scheme may verify further enhanced model performance by processing a hash operation and an embedding manipulation operation in a PIM. Hereinafter, example embodiments will be further described with reference to the accompanying drawings.

FIG. 1 illustrates a configuration of a near-memory processing system of embedding according to an example embodiment.

A biggest task of a recommendation system is to solve a memory bottleneck situation and a memory resource shortage issue caused by an embedding and various studies using a new structure and algorithm are being conducted. However, the new structure and algorithm also have various issues. In the case of a structural approach, dynamic random access memory (DRAM) resources are unnecessarily wasted for a bandwidth or a computing system is not considered. In the case of an algorithm approach, accuracy is inevitably degraded due to excessive compression to reduce an amount of embedding vectors. Overall, embedding of the recommendation system requires a new system that provides a scalable memory capacity and a wide bandwidth with little degradation in the accuracy.

According to an example embodiment, proposed is a near-memory processing system of hybrid embedding that may reduce a memory size and energy in a deep-learning-based recommendation system.

Also, proposed herein is a hybrid near-memory processing system using two different memories, a main memory (e.g., dual in-line memory module (DIMM)) 140 and an HBM 130. Also, to further improve inference performance by efficiently using a structure of PIM 120-HBM 130, a data offloading scheme and a task offloading scheme are proposed.

The proposed hybrid near-memory processing system of embedding includes a graphics processing unit (GPU) 110, the PIM 120-HBM 130, a central processing unit (CPU) 150, and the main memory (e.g., DIMM) 140.

According to an example embodiment, an embedding vector may be loaded to a wide bandwidth through the GPU 110 and the PIM 120-HBM 130. This is a structure suitable for a complex computing system and enables fast inference for a recommendation system. Also, by also applying a structure of the CPU 150-main memory 140, burden of the HBM 130 may be relived for a large embedding table and a memory capacity shortage issue may be solved.

An operating method of the near-memory processing system of hybrid embedding proposed herein divides and stores an embedding table in the main memory 140 and the HBM 130 in a training process for inference of the recommendation system. Here, as a larger number of embedding vectors are located in the HBM 130, the inference performance may be further improved.

When the embedding table is divided and located in the main memory 140 and the HBM 130, an embedding lookup operation is performed in the main memory 140 or the HBM 130 according to a location of a necessary embedding vector in an inference process.

An additional embedding manipulation (e.g., sum, mean, max) operation may be performed in the CPU 150 and the PIM 120 with respect to the embedding vector of which the embedding lookup operation is completed.

Embedding vectors processed through embedding manipulation are finally concatenated in the PIM 120 to generate an embedding result.

The generated embedding result is transmitted to the GPU 110 to derive a final inference result through a top multilayer perceptron (MLP) process.

In an inference process according to an example embodiment, various operations may be performed in the PIM 120 to solve a bandwidth issue and an energy issue caused by movement of many embedding vectors.

Figure 2:
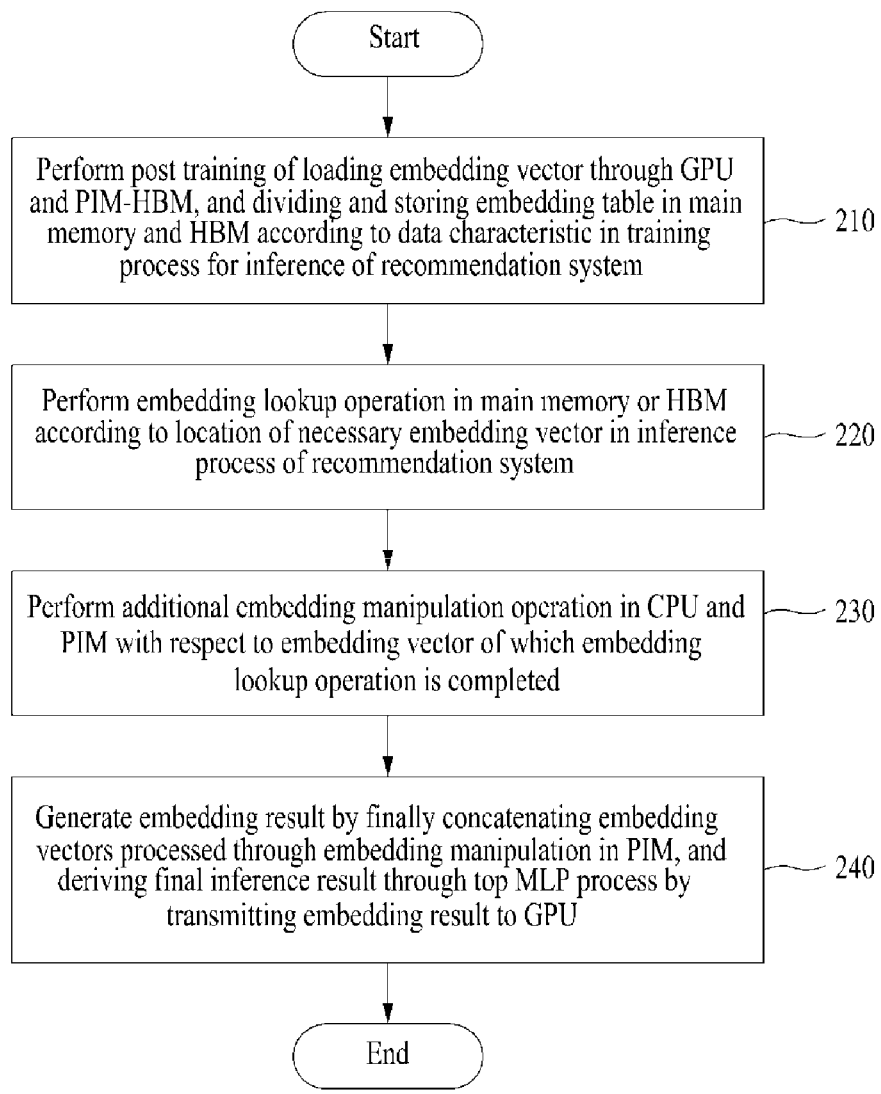
FIG. 2 is a flowchart illustrating a near-memory processing method of embedding according to an example embodiment.

FIG. 2 is a flowchart illustrating a near-memory processing method of embedding according to an example embodiment.

An operating method of a hybrid near-memory processing system including a GPU, a PIM-HBM, a CPU, and a main memory according to an example embodiment may include operation 210 of performing post training of loading an embedding vector through the GPU and the PIM-HBM, and dividing and storing an embedding table in the main memory and the HBM according to a data characteristic in a training process for inference of a recommendation system; operation 220 of performing an embedding lookup operation in the main memory or the HBM according to a location of a necessary embedding vector in an inference process of the recommendation system; operation 230 of performing an additional embedding manipulation operation in the CPU and the PIM with respect to the embedding vector of which the embedding lookup operation is completed; and operation 240 of generating an embedding result by finally concatenating embedding vectors processed through embedding manipulation in the PIM, and deriving a final inference result through a top MLP process by transmitting the embedding result to the GPU.

In operation 210, the post training of loading the embedding vector through the GPU and the PIM-HBM and dividing and storing the embedding table in the main memory and the HBM according to the data characteristic in the training process for inference of the recommendation system is performed.

Here, a data offloading storage scheme of storing a hot embedding vector in the HBM and storing a cold embedding vector in the main memory according to the number of accesses to the embedding table is used to increase a memory bandwidth and to solve a memory capacity shortage issue.

According to an example embodiment, the post training is performed through compositional embeddings to use the data offloading storage scheme. The post training includes a process of classifying the number of embedding vector data to be stored in the main memory and the HBM by setting the number of optimal embedding vector data according to a hash collision and a process of integrating an embedding table to be stored in the main memory in the same form as an original embedding table to reduce an unnecessary hash function computation process.

In operation 220, the embedding lookup operation is performed in the main memory or the HBM according to the location of the necessary embedding vector in the inference process of the recommendation system.

In operation 230, the additional embedding manipulation operation is performed in the CPU and the PIM with respect to the embedding vector of which the embedding lookup operation is completed.

Here, a task offloading scheme of processing embedding lookup through a hash computation using the PIM is performed.

The task offloading scheme according to an example embodiment, in response to an input of an input index, computes an index for each of Q table and R table through the hash computation in the PIM, loads an embedding vector from each of the Q table and the R table using the corresponding index, and generates the final embedding vector through an embedding manipulation process for the loaded embedding vectors.

The embedding manipulation according to an example embodiment concatenates the loaded embedding vectors in the case of one hot embedding and generates the final embedding vector through an inter-vector operation in the case of a multi-hot embedding according to an embedding dataset.

In operation 240, the embedding result is generated by finally concatenating the embedding vectors processed through embedding manipulation in the PIM, and the final inference result is derived through the top MLP process by transmitting the embedding result to the GPU.

Figure 3:
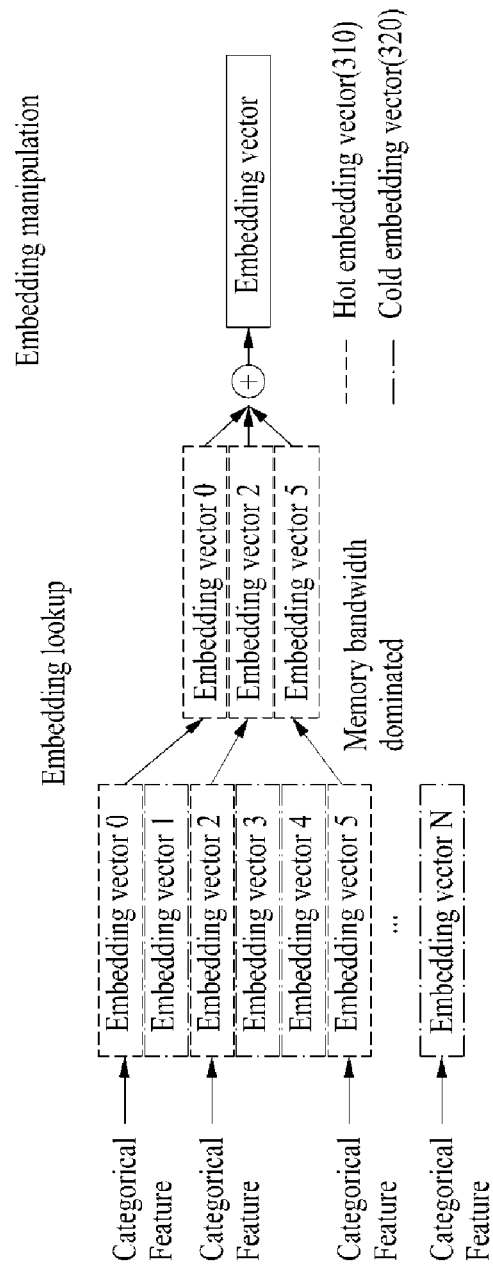
FIG. 3 illustrates characteristics of an embedding table according to an example embodiment.

FIG. 3 illustrates characteristics of an embedding table according to an example embodiment.

In a proposed near-memory processing structure of hybrid embedding, an HBM provides an available maximum bandwidth as an on-chip computing device. However, compared to a generally used double data rate (DDR) memory, the HBM has a small capacity and has low ease of memory expansion in an on-chip structure and tens of giga bytes of storage space may be used accordingly. Therefore, although the HBM is most effective in solving a memory bottleneck situation that may occur in embedding, it may be difficult to store all hundreds of gigabytes of embedding table. To solve this issue, additional memory expansion is required. Herein, proposed is a structure that also uses a main memory (e.g., DIMM).

Referring to FIG. 3, the embedding table includes a hot embedding vector 310 that is frequently accessed and a cold embedding vector 320 that is relatively less accessed, according to the number of accesses. Also, although it is really partial compared to the cold embedding vectors 320, most accesses occur in the hot embedding vectors 310 in an inference process. For example, in the case of Criteo Kaggle dataset, remaining 32 million accesses occur in top 0.0003% of embedding vectors.

Figure 4:
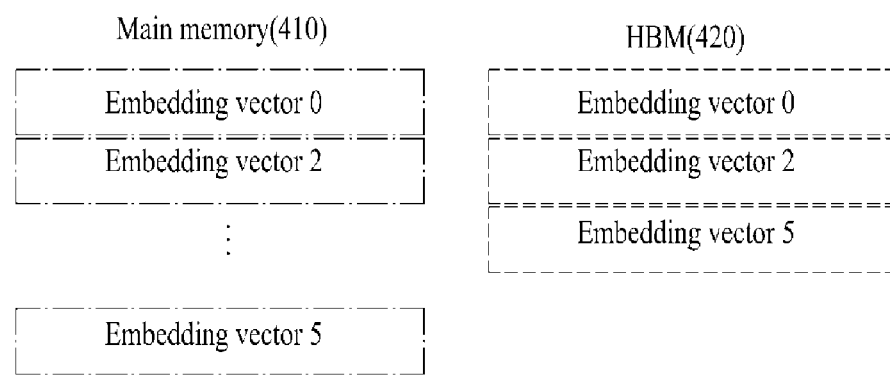
FIG. 4 illustrates an example of data offloading according to an example embodiment.

FIG. 4 illustrates an example of data offloading according to an example embodiment.

Referring to FIG. 4, a wide memory bandwidth may be used by storing hot embedding vectors in an HBM 420 according to a data characteristic and an insufficient memory issue may be solved by locating cold embedding vectors in a main memory 410. Herein, this storage scheme is defined as data offloading.

Figure 5:
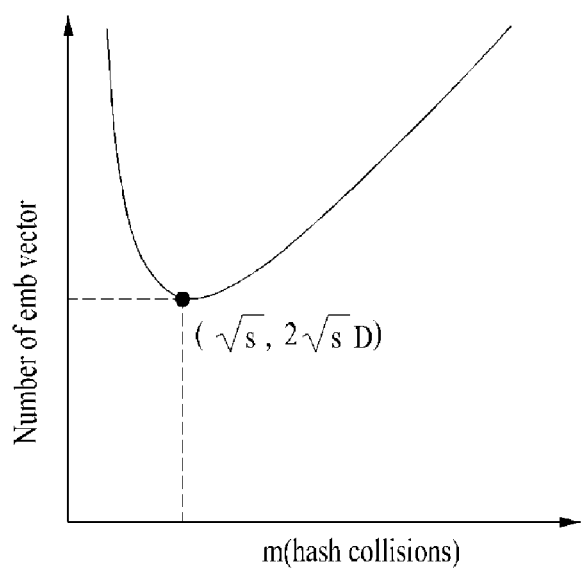
FIG. 5 is a graph showing the number of embedding vectors over a hash collision according to an example embodiment.

FIG. 5 is a graph showing the number of embedding vectors over a hash collision according to an example embodiment.

To use an embedding table stored in each of a main memory and an HBM in an inference process according to an example embodiment, a data offloading scheme needs to perform post training in a training process. Therefore, a post training process of training an embedding table and dividing and storing the embedding table before completing training is required. Here, training is performed using a compositional embedding method to store a larger amount of data in the HBM with a wider bandwidth. In the case of using the compositional embedding scheme, a size of the embedding table may be effectively reduced using a double hash. Therefore, the effect of the HBM may be further maximized by storing a large amount of embedding table in the HBM. Here, the compositional embedding scheme determines memory efficiency and model accuracy according to a hash collision designated by a user.

In the case of using compositional embeddings, the number of embedding vector data is determined according to a hash collision as illustrated in FIG. 5. For example, in the case of selecting a hash collision corresponding to an inflection point, the number of embedding vector data may be maximally reduced and a large amount of embedding vectors may be stored in the HBM. However, if the number of embedding vector data is excessively reduced, a unique representation for all the original embedding vectors may not be made, which leads to degrading accuracy. Therefore, it is important to select an appropriate hash collision value according to an environment of a user.

The post training operation according to an example embodiment is performed when training of the embedding table is completed using the compositional embedding scheme. The post training is largely divided into two processes, a process of classifying the number of embedding vector data (top-k) to be stored in the main memory and the HBM by setting the optimal number of embedding vector data according to a hash collision and a process of integrating an embedding table to be stored in the main memory.

Figure 6:
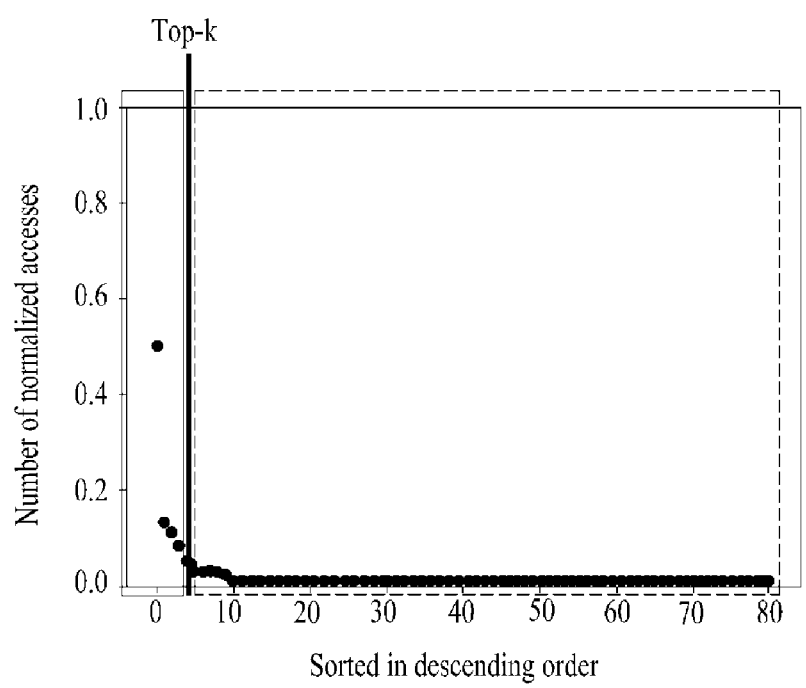
FIG. 6 is a graph showing a data distribution of datasets according to an example embodiment.

FIG. 6 is a graph showing a data distribution of datasets according to an example embodiment.

FIG. 6 illustrates a result of a partial embedding table when performing inference using Criteo Ad Kaggle dataset. The normalized number of accesses is represented based on the total number of embedding lookups and embedding vectors are sorted in descending order based on the number of embedding lookups. FIG. 6 shows that frequent accesses occur in some top data of embedding vectors.

A first process of post training according to an example embodiment uses data characteristics of a recommendation system and, as in FIG. 6, a user sets the optimal number of embedding vector data (top-k) according to a hash collision in consideration of a storage space of an HBM.

Figure 7:
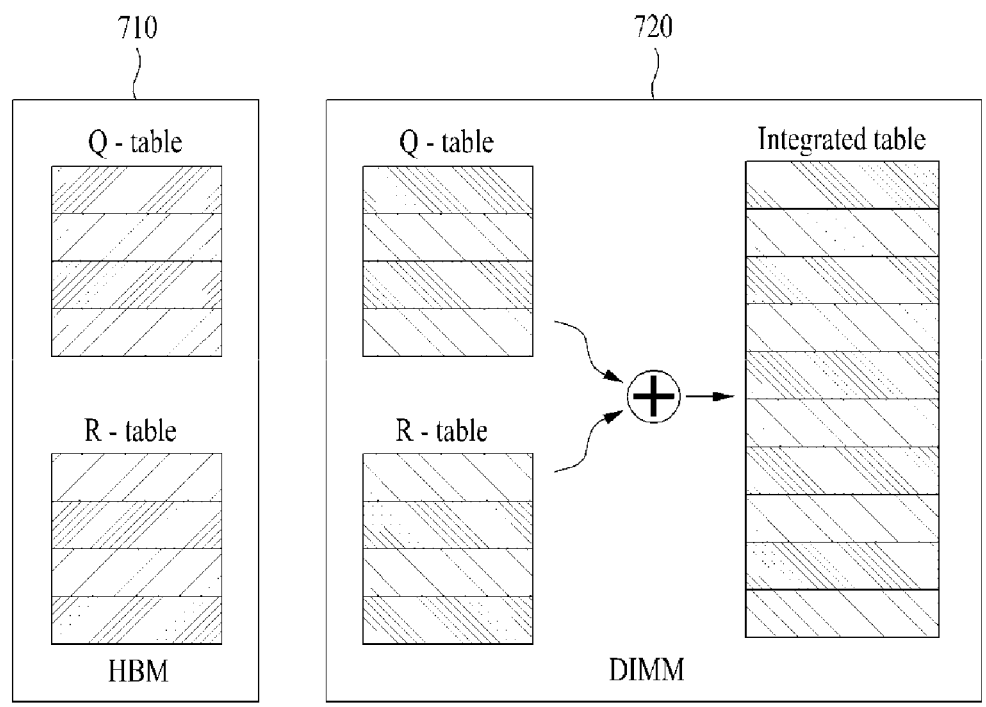
FIG. 7 illustrates a preprocessing process according to an example embodiment.

FIG. 7 illustrates a preprocessing process according to an example embodiment.

When the optimal number of embedding vector data (top-k) according to a hash collision is determined, an embedding table is divided and stored in an HBM 710 and a main memory (e.g., DIMM) 720 as illustrated in FIG. 7. Here, an embedding table to be stored in the main memory 720 requires a second process of post training of integrating again in the same form as an original embedding table rather than Q table and R table derived from a compositional embedding result. The second process of the post training is required to reduce an unnecessary hash function computation process. To use Q table and R table in an inference process, an index of an embedding vector needs to be computed through a hash function. Therefore, in the case of the HBM 710, hash function computation is useful through a PIM located on a logic die. In the case of the main memory 720, memory expansion is easy. Therefore, unnecessary hash function computation may be reduced by storing an integrated table.

Figure 8:
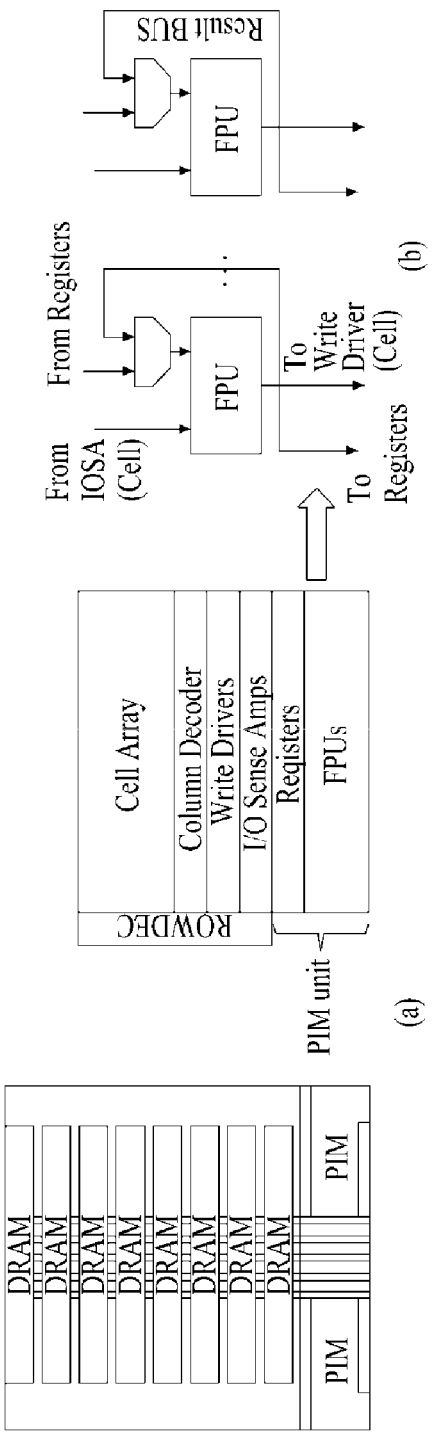
FIG. 8 illustrates a processing-in-memory in high bandwidth memory (PIM-HBM) structure according to an example embodiment.

FIG. 8 illustrates a PIM-HBM structure according to an example embodiment.

When a post training process is completed in a training process of a recommendation system according to an example embodiment, efficient inference may be performed in a hybrid near-memory processing structure.

Herein, proposed is a task offloading scheme using a PIM to effectively solve bandwidth and energy issues caused by movement of many embedding vectors in an inference process.

In the case of a hybrid near-memory processing structure, a PIM required for an arithmetic operation of FIG. 8 is located on a logic die of an HBM. (a) of FIG. 8 illustrates a PIM-HBM structure and (b) of FIG. 8 illustrates a PIM path.

The PIM may sufficiently perform hash computation through a unit capable of operating a floating point and various studies using the PIM for the hash computation are also being conducted. Therefore, a task offloading scheme of processing embedding lookup through hash computation using the PIM is used herein.

Figure 9:
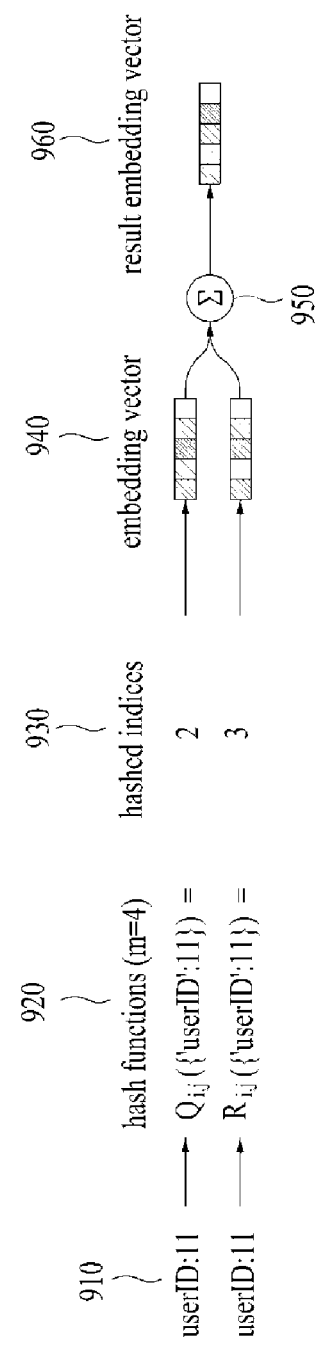
FIG. 9 illustrates an embedding table lookup operation located in an HBM according to an example embodiment.

FIG. 9 illustrates an embedding table lookup operation located in an HBM according to an example embodiment.

In a hybrid near-memory processing structure, the more embedding vectors are located in the HBM, the further inference performance of a recommendation system is improved. To this end, herein, an embedding table is divided in a form of Q table and R table and thereby stored in the HBM using a compositional embedding scheme. Therefore, to acquire a desired result through an embedding table located in the HBM in an inference process, an index of each of Q table and R table needs to be acquired through hash computation as in FIG. 9.

An embedding lookup process using a PIM according to an example embodiment is as illustrated in FIG. 9. Initially, when an input index 910 is input, the PIM computes indices 930 for Q table and R table through hash computation 920. Subsequently, an embedding vector 940 is loaded from each embedding table using the corresponding index 930. The loaded embedding vectors 940 are concatenated into a final embedding vector 960 through an embedding manipulation process 950. Here, the embedding manipulation process 950 is performed in the PIM.

Figure 10:
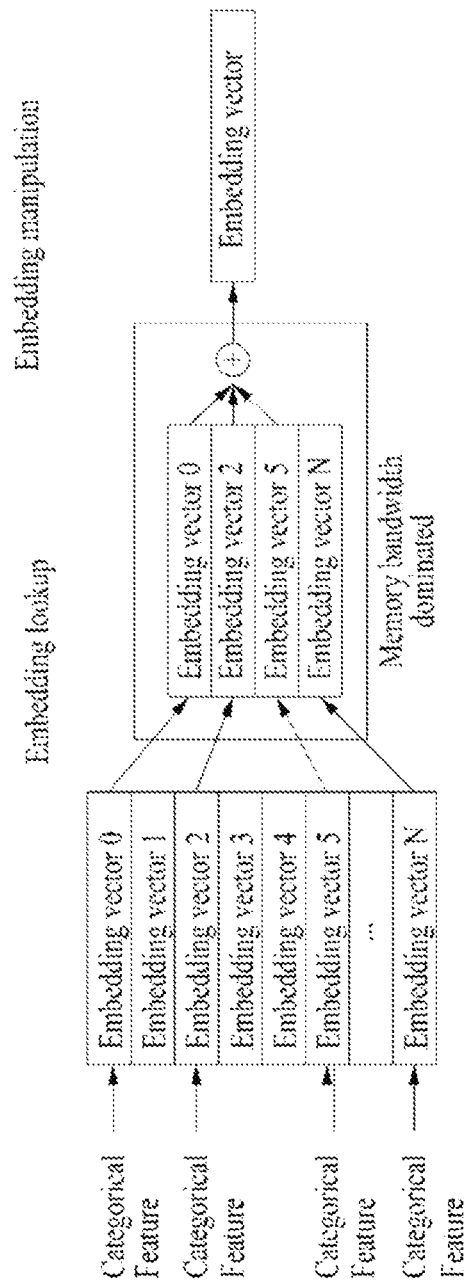
FIG. 10 illustrates an embedding process in a recommendation system according to an example embodiment.

FIG. 10 illustrates an embedding process in a recommendation system according to an example embodiment.

Referring to FIG. 10, the embedding process of the recommendation system reads embedding vectors through embedding lookup and acquires a final embedding vector through an embedding manipulation process.

When a categorical feature that is input data is input, the embedding process is divided into an embedding lookup operation of finding information corresponding to the categorical feature from the embedding table and bringing a value and an embedding manipulation operation of converting a read embedding vector to data suitable for a model. An embedding of the recommendation system requires hundreds of gigabytes (GB) of the embedding table to improve model accuracy, which causes a memory resource shortage issue. Also, in the embedding process, the embedding table lookup operation causes irregular memory accesses and a memory bottleneck situation.

Figure 11:
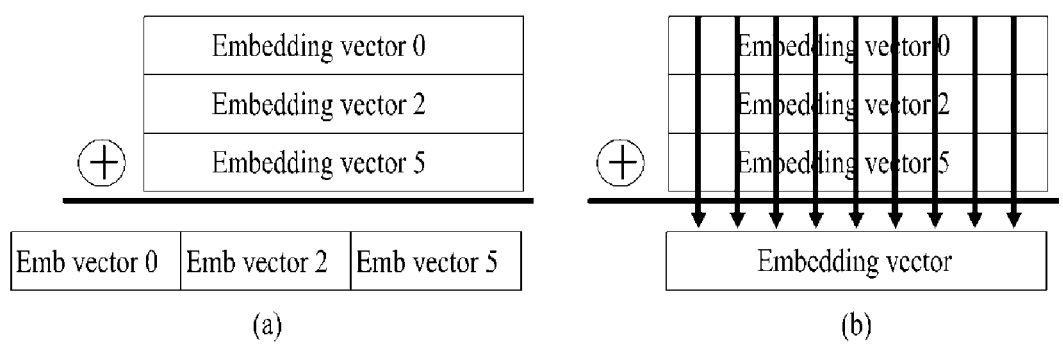
FIG. 11 illustrates embedding manipulation according to an example embodiment.

FIG. 11 illustrates embedding manipulation according to an example embodiment.

An embedding manipulation process according to an example embodiment needs to convert an embedding vector to one suitable for deep learning through a computation process of FIG. 11 and goes through a different computation process according to an embedding dataset. One hot embedding datasets represent weights by expressing an $i^{th}$ location of an embedding vector to be read from an embedding table as 1 and another location as 0. Multi hot embedding datasets refer to a case in which a plurality of $i^{th}$ locations to be read are present and may be represented as a weighted combination of multiple items. Therefore, one hot embedding ((a) of FIG. 11) concatenates read embedding vectors and multi hot embedding ((b) of FIG. 11) generates a final embedding vector through an inter-vector operation (e.g., sum, mean, max). Herein, in the case of a hybrid near-memory processing structure, embedding manipulation is processed in a PIM. Here, since multi hot datasets may represent a plurality of embedding vectors as a single embedding vector, an amount of data movement to a host processor may be effectively reduced.

The systems or the apparatuses described herein may be implemented using hardware components, software components, and/or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, data files, data structures, and the like. The program instructions stored in the media may be specially designed and configured for the example embodiments or may be known to one skilled in the computer software art and thereby available. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A hybrid near-memory processing system comprising a graphics processing unit (GPU), a processing-in-memory in high bandwidth memory (PIM-HBM), a central processing unit (CPU), and a main memory, wherein:
an embedding vector is loaded through the GPU and the PIM-HBM,
an embedding table is divided and stored in the main memory and the HBM in a training process for inference of a recommendation system,
an embedding lookup operation is performed in the main memory or the HBM according to a location of a necessary embedding vector in an inference process of the recommendation system,
an additional embedding manipulation operation is performed in the CPU and the PIM with respect to the embedding vector of which the embedding lookup operation is completed,
embedding vectors processed through embedding manipulation are finally concatenated in the PIM to generate an embedding result, and
the embedding result is transmitted to the GPU to derive a final inference result through a top multiplayer perceptron (MLP) process,
wherein a data offloading storage scheme of storing a hot embedding vector in the HBM and storing a cold embedding vector in the main memory according to the number of accesses to the embedding table is used to increase a memory bandwidth and to increase memory capacity.

2. The hybrid near-memory processing system of claim 1, wherein post training is performed through compositional embeddings to use the data offloading storage scheme, and
the post training includes a process of classifying the number of embedding vector data to be stored in the main memory and the HBM by setting the number of optimal embedding vector data according to a hash collision and a process of integrating an embedding table to be stored in the main memory in the same form as an original embedding table to reduce an unnecessary hash function computation process.

3. A hybrid near-memory processing system comprising a graphics processing unit (GPU), a processing-in-memory in high bandwidth memory (PIM-HBM), a central processing unit (CPU), and a main memory, wherein:
an embedding vector is loaded through the GPU and the PIM-HBM,
an embedding table is divided and stored in the main memory and the HBM in a training process for inference of a recommendation system,
an embedding lookup operation is performed in the main memory or the HBM according to a location of a necessary embedding vector in an inference process of the recommendation system,
an additional embedding manipulation operation is performed in the CPU and the PIM with respect to the embedding vector of which the embedding lookup operation is completed,
embedding vectors processed through embedding manipulation are finally concatenated in the PIM to generate an embedding result, and
the embedding result is transmitted to the GPU to derive a final inference result through a top multiplayer perceptron (MLP) process,
wherein a task offloading scheme of processing embedding lookup through a hash computation using the PIM is performed, and
the task offloading scheme, in response to an input of an input index, computes an index for each of Q table and R table through the hash computation in the PIM, loads an embedding vector from each of the Q table and the R table using the corresponding index, and generates the final embedding vector through an embedding manipulation process for the loaded embedding vectors.

4. The hybrid near-memory processing system of claim 3, wherein the embedding manipulation concatenates the loaded embedding vectors in the case of one hot embedding and generates the final embedding vector through an intervector operation in the case of a multi-hot embedding according to an embedding dataset.

5. An operating method of a hybrid near-memory processing system comprising a graphics processing unit (GPU), a processing-in-memory in high bandwidth memory (PIM-HBM), a central processing unit (CPU), and a main memory, the method comprising:
performing post training of loading an embedding vector through the GPU and the PIM-HBM, and dividing and storing an embedding table in the main memory and the HBM according to a data characteristic in a training process for inference of a recommendation system;
performing an embedding lookup operation in the main memory or the HBM according to a location of a necessary embedding vector in an inference process of the recommendation system;
performing an additional embedding manipulation operation in the CPU and the PIM with respect to the embedding vector of which the embedding lookup operation is completed; and
generating an embedding result by finally concatenating embedding vectors processed through embedding manipulation in the PIM, and deriving a final inference result through a top multiplayer perceptron (MLP) process by transmitting the embedding result to the GPU, wherein the performing the post training of loading the embedding vector through the GPU and the PIM-HBM, and dividing and storing the embedding table in the main memory and the HBM according to the data characteristic in the training process for inference of the recommendation system comprises using a data offloading storage scheme of storing a hot embedding vector in the HBM and storing a cold embedding vector in the main memory according to the number of accesses to the embedding table to increase a memory bandwidth and to solve a memory capacity shortage issue.

6. The method of claim 5, wherein the post training is performed through compositional embeddings to use the data offloading storage scheme, and the post training includes a process of classifying the number of embedding vector data to be stored in the main memory and the HBM by setting the number of optimal embedding vector data according to a hash collision and a process of integrating an embedding table to be stored in the main memory in the same form as an original embedding table to reduce an unnecessary hash function computation process.

\* \* \* \* \*